United States Patent [19]
Karl et al.

[11] Patent Number: 5,553,895
[45] Date of Patent: Sep. 10, 1996

[54] COUPLING ASSEMBLY

[75] Inventors: Terry L. Karl, Blissfield, Mich.; Gregory J. Gloden; Philip C. Van Riper, both of Holland, Ohio; John P. Zainea, Middle Point, Ohio; John T. Myers, Haviland, Ohio

[73] Assignee: Aeroquip Corporation, Maumee, Ohio

[21] Appl. No.: 433,581

[22] Filed: May 3, 1995

[51] Int. Cl.⁶ .................................................. F16L 35/00
[52] U.S. Cl. .............................. 285/39; 285/38; 285/93; 285/308; 285/321; 285/422; 285/921
[58] Field of Search .................................. 285/308, 321, 285/39, 38, 93, 422, 921

[56] References Cited

U.S. PATENT DOCUMENTS

| | | | |
|---|---|---|---|
| 2,479,960 | 8/1949 | Osborn | 285/308 |
| 2,848,255 | 8/1958 | Klein et al. | 285/321 X |
| 3,177,018 | 4/1965 | Goodwin | 285/321 X |
| 3,398,977 | 8/1968 | Yoneda | 285/321 |
| 3,773,360 | 11/1973 | Timbers | 285/321 |
| 3,887,222 | 6/1975 | Hammond | 285/321 |
| 4,105,226 | 8/1978 | Frey et al. | 285/321 |
| 4,240,654 | 12/1980 | Gladieux | 285/321 X |
| 4,872,710 | 10/1989 | Konecny et al. | 285/321 X |
| 5,022,687 | 6/1991 | Ariga | 284/321 |
| 5,076,541 | 7/1993 | Daghe et al. | 251/309 |
| 5,226,682 | 7/1993 | Marrison et al. | 285/308 |

FOREIGN PATENT DOCUMENTS

| | | | |
|---|---|---|---|
| 373920 | 6/1990 | European Pat. Off. | 285/308 |
| 659848 | 1/1964 | Italy | 285/321 |

OTHER PUBLICATIONS

Aeroquip Aerospace Engineering Bulletin, No. AEB 65, Aeroquip Corporation, 1964.
Aeroquip Aerospace Engineering Bulletin, No. AEB 40, Aeroquip Corporation, 1970.

*Primary Examiner*—Dave W. Arola
*Attorney, Agent, or Firm*—Emch, Schaffer, Schaub & Porcello

[57] ABSTRACT

A coupling assembly includes a female member having a receiving end with an axially extending passageway and inwardly facing groove extending outwardly from said passageway in a position spaced from the receiving end. A split metal locking ring is positioned in the groove. A male member is sized to be received in said receiving end and includes a rib having (i) a ramp tapering in a direction away from the forward end and away from the axis at an angle in the range of 10° to 25°, (ii) a cylindrical surface parallel to the axis extending rearwardly from the ramp a distance of at least 0.010 and preferably 0.030 inch and (iii) a shoulder tapering away from the forward end and inwardly toward the axis. Upon insertion of the male member into the female member, the split metal ring is expanded as it rides over the ramp, engages the cylindrical surface and retracts to a smaller diameter approaching its original size to engage the shoulder thereby locking the male member into engagement with the female member. A release sleeve is mounted on the male member and is axially movable relative thereto to push the split locking ring up and off of the tapering shoulder to thereby disengage the male member from the female member.

45 Claims, 10 Drawing Sheets

COUPLING ASSEMBLY

BACKGROUND ART

There is a great need in the field of hydraulic, pneumatic and refrigerant systems for a coupling which may be secured in placed by a simple axial movement of a male member into a female member and which will permit the flow of fluids therethrough without leakage even when the system is subjected to high pressures. U.S. Pat. No. 5,226,682, assigned to the assignee to the present application, discloses various embodiments of one type of coupling assembly.

DISCLOSURE OF INVENTION

The present invention is directed to a coupling assembly in which there is provided a first male member having an outwardly extending rib defined by (1) a ramp tapering within a specific angular range relative to the axis; (2) a cylindrical surface extending parallel to the axis for a minimal distance and (3) a shoulder tapering inwardly toward the axis and a second female member having a passageway with an inwardly facing cavity in which is positioned a split metal ring having a first end and a second end aligned to permit abutting engagement and defining a gap not to exceed 0.030 inch and, preferably, not to exceed 0.010 inch. Upon movement of the first male member into the second female member, the split ring is caused to travel up the tapered ramp, over the cylindrical surface and resiliently contract against the tapered shoulder to thereby engage the rib thus retaining the male member firmly engaged to the female member. A release sleeve is moveably mounted on the exterior surface of the first male member and has an edge which, upon movement of the release sleeve toward the split ring, urges the split ring in a reverse direction and outwardly along the tapered shoulder to said cylindrical surface thereby permitting the first male member to be removed from the second female member. The coupling assembly of the present invention is capable of having the male member securely retained to the female member under significantly higher pressures than prior art couplings utilizing split rings.

BEST MODE OF CARRYING OUT THE INVENTION

Figure 1:
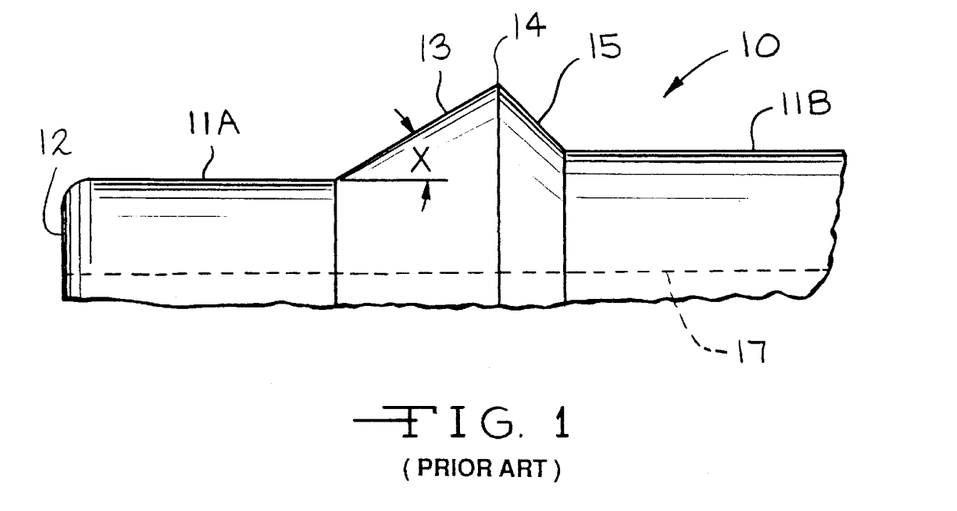
FIG. 1 is a fragmentary elevational view showing specifically the rib portion of a prior art male member.

Referring to FIG. 1, there is shown one form of prior art male member 10 having exterior surface portions 11A and 11B with a rib extending outwardly from and positioned between such exterior surface portions 11A and 11B. The male member 10 has a leading end 12 intended to be inserted into the receiving end of a female member. The male member 10 includes a passageway 17 extending therethrough along an axis (not shown). The rib includes a ramp 13 tapering outwardly from the exterior surface portion 11A in a direction away from the leading end 12 at an angle X relative to such exterior surface portion 11A and the axis of the male member which is parallel thereto. The ramp angle X of the prior art couplings were in the range of approximately 30 degrees. The ramp 13 extends to an apex 14. The rib then extends from the apex 14 along a tapered shoulder 15 to the second exterior surface portion 11B. A prior art device having the aforesaid rib construction is shown in FIGS. 7 through 9 of U.S. Pat. No. 5,226,682.

In the manufacture of couplings designed to meet standards of the Society of Automotive Engineers (SAE) it is customary to manufacture such couplings from G12000 series steel as set forth in the Unified Numbering System for SAE and the American Iron and Steel Institute (AISI) and are designed to be used with hydraulic hoses meeting standards established by SAE. For example, the prior art device shown in FIGS. 7 through 9 of U.S. Pat. No. 5,226,682 is suitable for operating with hydraulic hose meeting SAE Standard J517-Series 100R2. Couplings for use in automotive applications in Europe are also manufactured from G12000 series steel but must meet standards issued by Deutsches Institut fur Normung (DIN), Berlin, Germany. DIN Standard 20022 Part 2 includes standards for Type 2ST hoses which are more stringent than those of the corresponding SAE J517-Series 100R2 Pressure Standard. Set forth below is a table setting forth a comparison of the pressure standards for couplings of various sizes according to (1) (SAE J517 -Series 100R2 Pressure Standard and (2) DIN Standard 20022 Part 2, Type 2ST Pressure Standard:

| Size | Operating Pressure SAE 100R2 | Operating Pressure DIN Type 2ST |
| --- | --- | --- |
| −6  | 4,000 psi | 4,785 psi |
| −8  | 3,500 psi | 3,988 psi |
| −10 | 2,750 psi | 3,625 psi |
| −12 | 2,250 psi | 3,117 psi |
| −16 | 2,000 psi | 2,393 psi |

| Size | Operating Pressure SAE 100R2 | Operating Pressure DIN Type 2ST |
|---|---|---|
| −20 | 1,625 psi | 1,813 psi |
| −24 | 1,250 psi | 1,305 psi |

The Operating Pressures for the above SAE and DIN Standards have been established on the assumption that the burst pressures for the various sizes will be four times as great as the specified Operating Pressure and that hoses and couplings to be used therewith will actually be tested to Proof Pressures twice as great as the specified Operating Pressures. Obviously, the coupling assembly could be used at pressures significantly lower than the pressures specified in the SAE and DIN Standards.

Prior art couplings of the type utilizing a rib and a split metal lock ring which have been tested withstand pressures of four times the specified Operating Pressure for the SAE 100R2 Standards but not for the DIN Type 2ST Standards. In contrast, the coupling assembly of the present invention is capable of withstanding pressures of four times the specified Operating Pressures for both the SAE 100R2 Standards and the DIN Type 2ST Standards. Thus, the forces imparted on prior art couplings of this type which are subjected to a pressure of four times the specified DIN Type 2ST Operating Pressure may cause the rib of the male member to be sheared off resulting in a failure of the coupling assembly. The ability to withstand such high pressures permits the coupling of the present invention to have a use in a much wider range of applications than the prior art couplings. For example, the pressures developed in hydraulic systems of earthmovers are such as to preclude the use of the prior art couplings of the type shown in FIG. 1 while the coupling assemblies of the present invention are satisfactory for such high pressure use.

Figure 2:
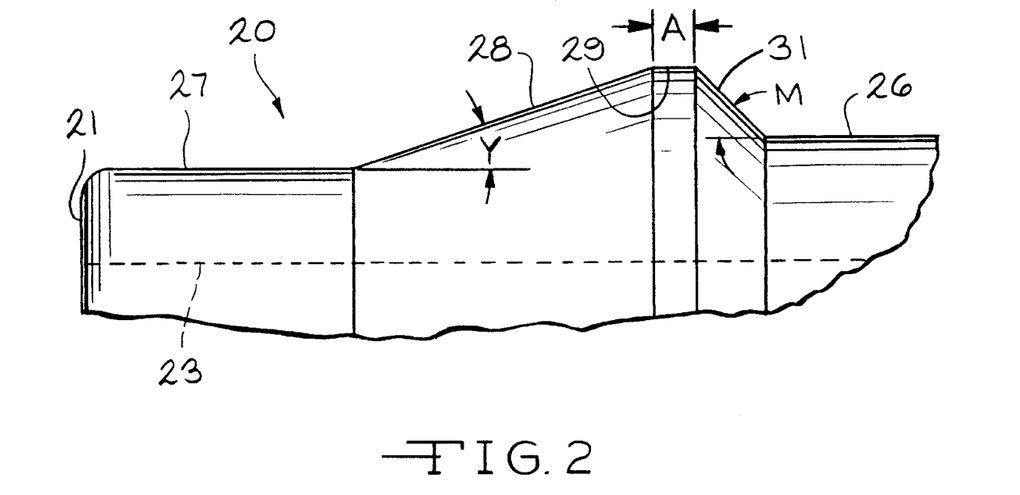
FIG. 2 is a fragmentary elevational view of the male member formed according to the present invention showing specifically the rib portion.
Figure 3:
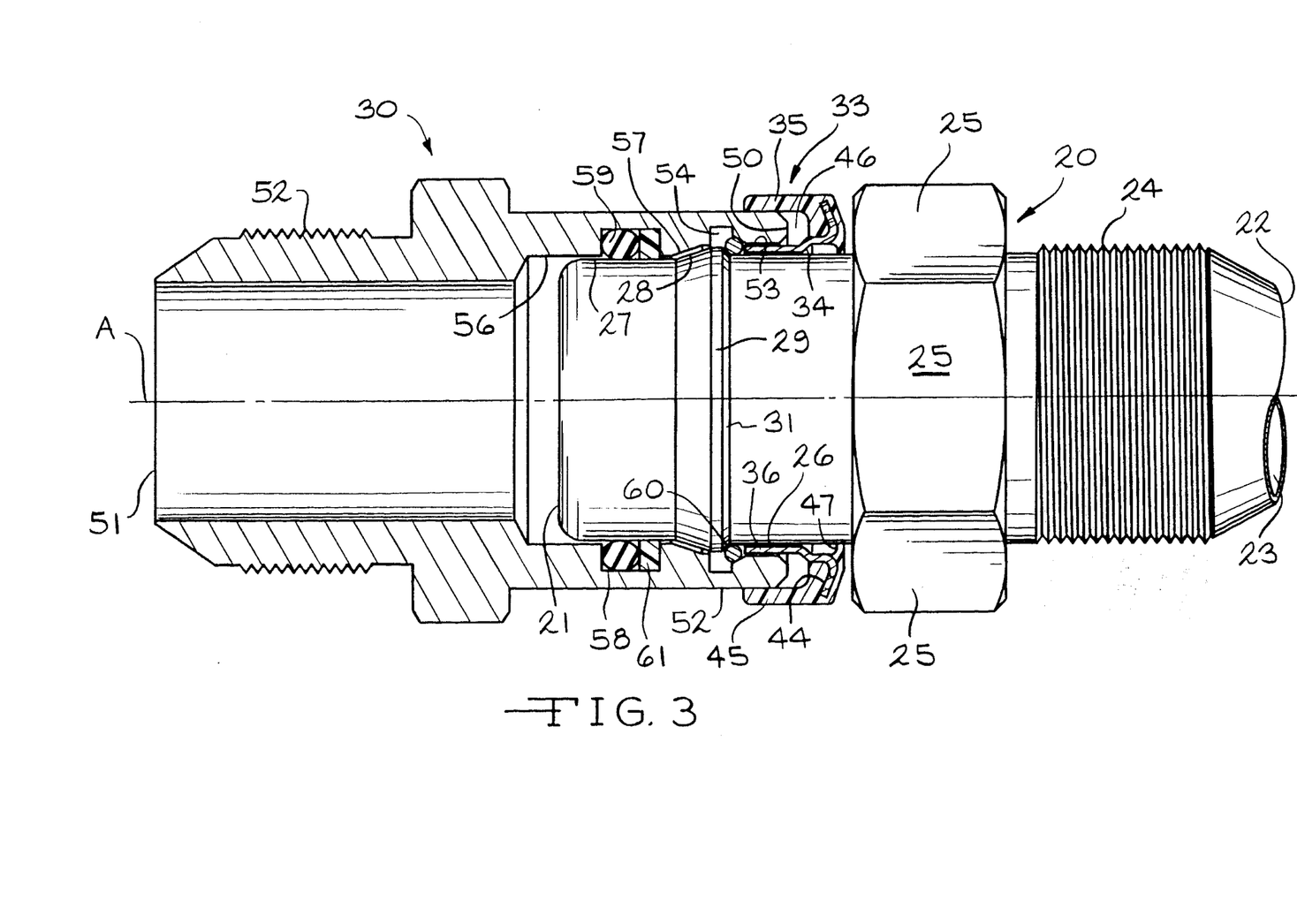
FIG. 3 is an elevational view of the coupling assembly of the present invention in the fully coupled position with the female member and the release sleeve of the male member shown in section.

Referring to FIGS. 2 through 7, the coupling assembly of the present invention includes a first male member 20 and a second female member 30. Each of the male member 20 and female member 30 extends along an axis A when the assembly is in the coupled position as shown in FIG. 3. The male member 20 extends from a leading end 21 intended for insertion in the female member 30 to a trailing end 22 and has a passageway 23 extending therethrough. If desired, the trailing end 22 may be provided with external threads 24 for attachment to a threaded coupling (not shown) and a series of flats 25 defining a hexagonal cross section for engagement by a wrench.

Forwardly of the hexagonal cross section defined by the flats 25, the male member 20 has a trailing cylindrical exterior surface 26 and a leading exterior surface 27 which are separated by a rib. The rib includes a tapered ramp 28 extending rearwardly and outwardly from the leading exterior surface 27 at an angle Y relative to the axis A in the range of 10 degrees to 25 degrees and preferably at an angle of 18 degrees. The ramp 28 extends to a cylindrical surface 29 which is parallel to the axis and extends rearwardly from the ramp 28 a distance A of at least 0.010 inch and, preferably at least 0.030 inch. The final portion of the rib is a shoulder 31 which tapers rearwardly and inwardly from said cylindrical surface 29 to meet said trailing exterior surface 26. The shoulder 31 should taper at an angle M in the range of 35° to 55° relative to the axis A and preferably at an angle of about 45°.

The other component of the male member 20 is a separately formed release sleeve 33 consisting of a metal portion 34 and a thermoplastic and/or elastomeric (TPE) portion 35.

Figure 6:
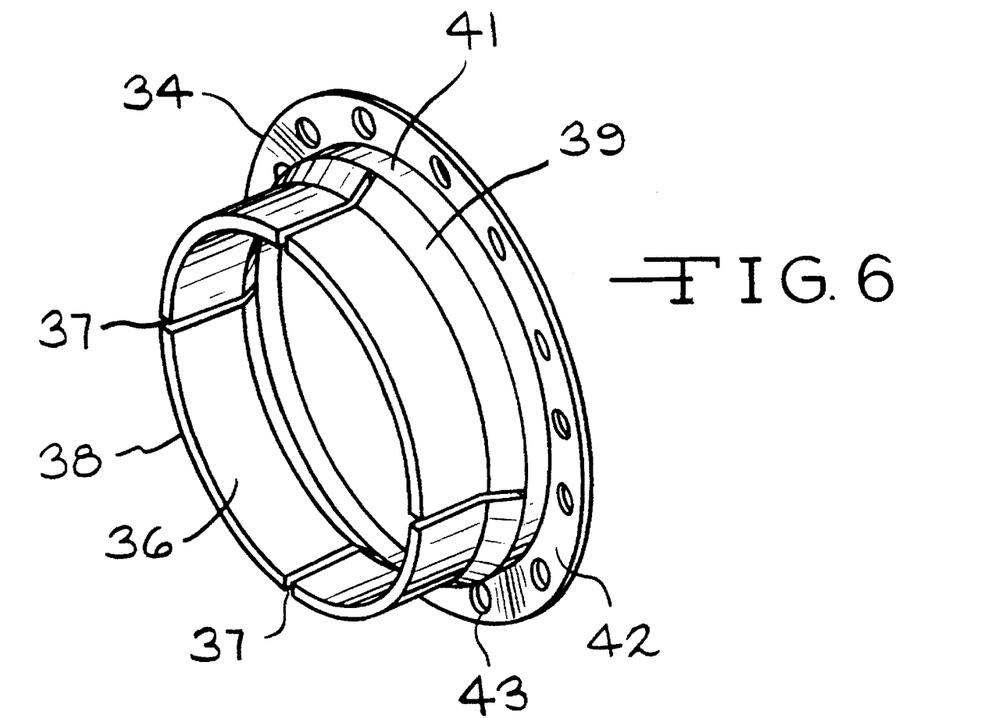
FIG. 6 is a perspective view showing the metal portion of the release sleeve.
Figure 7:
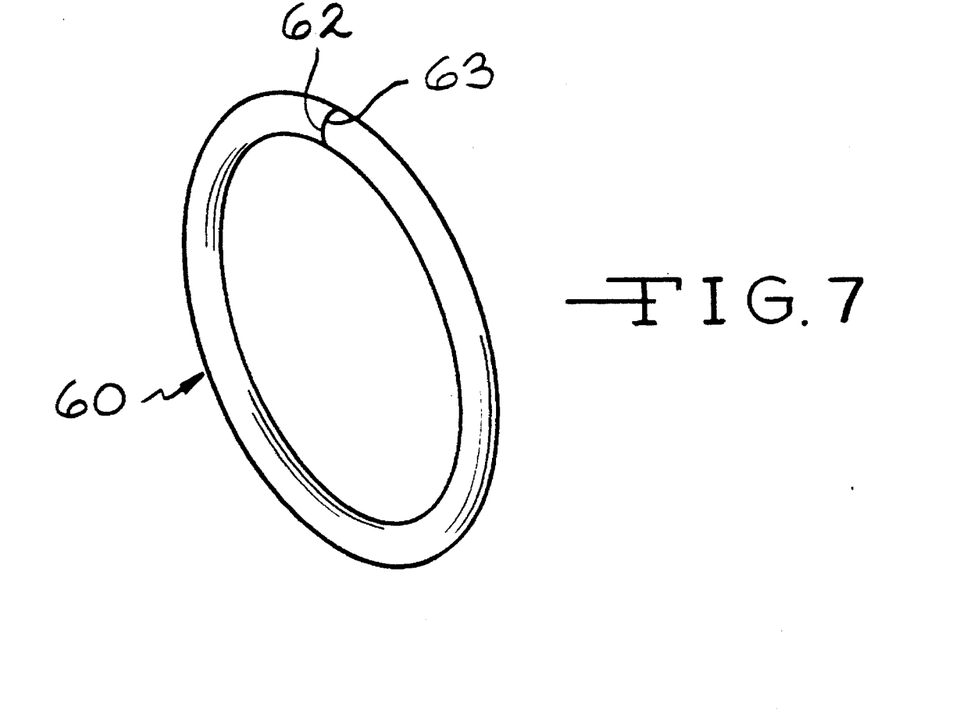
FIG. 7 is a perspective view showing the split locking ring.

As may be seen in FIG. 6, the metal portion 34 includes a split cylindrical wall 36 having a plurality of slots 37. The split cylindrical wall 36 extends from a leading end 38 to an outwardly tapering wall portion 39. The slots 37 may, if desired, extend into the tapered wall portion 39. A larger cylindrical wall portion 41 extends from the tapered wall portion 39 and has a radially outwardly extending flange 42 extending therefrom. The flange 42 has a plurality of apertures 43. As may be seen in FIG. 3, the TPE portion 35 may be molded around the flange 42 and includes a flange portion 44 and a cylindrical wall portion 45 spaced from and substantially parallel to the split cylindrical wall 36 of the metal portion 34. During molding of the TPE portion 35 around the flange 42 of the metal portion 34, plastic and/or elastomeric material will flow into the apertures 43 to provide for secure attachment to the metal portion 34. As can be seen in FIG. 3, the split cylindrical wall 36 and the cylindrical wall portion 45 cooperate to define a gap 46. The TPE portion 35 includes a sealing fin 47 extending radially inwardly from the flange portion 44 and inwardly from the larger cylindrical wall portion 41. The sealing fin 47 extends inwardly sufficiently for to snugly engage the trailing cylindrical exterior surface 26 to thereby function as a dust seal to prevent dust from, or at least minimize the possibility of dust, entering the engaged coupling between the release sleeve 33 and the trailing exterior surface 26.

The second female member 30 extends from a receiving end 50 to a remote end 51 which may have adjacent thereto external threads 52 or other suitable connection means for fastening to a separate connection (not shown). The portion of the second female member 30 adjacent the receiving end 50 is provided with an exterior cylindrical surface 52 having a size to be snugly received in the cylindrical wall 45 of the release sleeve 33 and an interior cylindrical surface 53 sized to receive therein the split cylindrical wall portion 36 of the metal portion 34 of release sleeve 33. An inwardly facing annular groove 54 extends outwardly from the interior cylindrical surface 53 and is sized to receive therein a split metal locking ring 60. A chamfer 55 extends at an angle inwardly from the annular groove 54 toward the receiving end 50 to meet the interior cylindrical surface 53. The angle N (FIG. 3A) between the chamfer 55 and the interior cylindrical surface 53 is in the range of 20° to 40° and is preferably 30°.

A second interior cylindrical surface 56 of smaller size than the first cylindrical surface 53 is positioned toward the remote end 51 from the annular groove 54 and is joined thereto by an inwardly tapering wall portion 57. The second interior cylindrical surface 56 is sized to receive the leading exterior surface 27 of the first male member 20. The second interior cylindrical wall surface 56 has formed therein an inwardly facing annular groove 58 in which is positioned an annular seal 59 of neoprene or other suitable sealing material and a rigid plastic ring 61 which is positioned in the groove 58 between the annular seal 59 and the receiving end 50. The plastic ring 61 has an aperture sized to snugly receiving the leading exterior surface 27 of the first male member and the annular seal 59 is sized to sealingly receive and engage such leading exterior surface 27. The presence of the rigid plastic ring 61 in a position to be engaged by the leading end 21 of the first male member 20 serves to protect the annular seal 59 from cutting or other damage upon insertion of the leading exterior surface 27 therethrough. The rigid plastic ring 61 also serves to protect the annular seal 59 from damage when used in systems having high impulse flow of fluid.

Positioned in the annular groove 54 is a split metal locking ring 60 formed of a spring tempered phosphoric bronze material or, preferably, a spring tempered stainless steel. The split locking ring 60 is provided with a first end 62 and a second end 63 which should either be in abutting relationship or have a maximum gap of 0.03 inch when the first male member 20 is disconnected from the second female member 30. The split locking ring 60, when the parts are in the disconnected position, has an external diameter smaller than the diameter defined by the outermost portion of the annular groove 54 but larger than the diameter of the first interior cylindrical surface 53. The split locking ring 60 has an internal diameter substantially equal to or, preferably, slightly smaller than that of the trailing exterior surface 26 of the male member 20 to snugly engage such trailing exterior surface 26 when the male member 20 is engaged to the female member 30. As will be appreciated, the internal diameter of the split locking ring 60 is therefore, significantly smaller than the diameter of the cylindrical surface 29. The split locking ring 60, by virtue of its dimensions, will be retained in the annular groove 54 when the first male member 20 is disconnected from the second female member 21. However, by virtue of its being split, the diametrical size of the locking ring 60 may be expanded and the end portions 62 and 63 become separated as the locking ring 60 moves over the ramp 28 and cylindrical surface 29 upon insertion of the first male member 20 into the second female member 30.

Figure 3A:
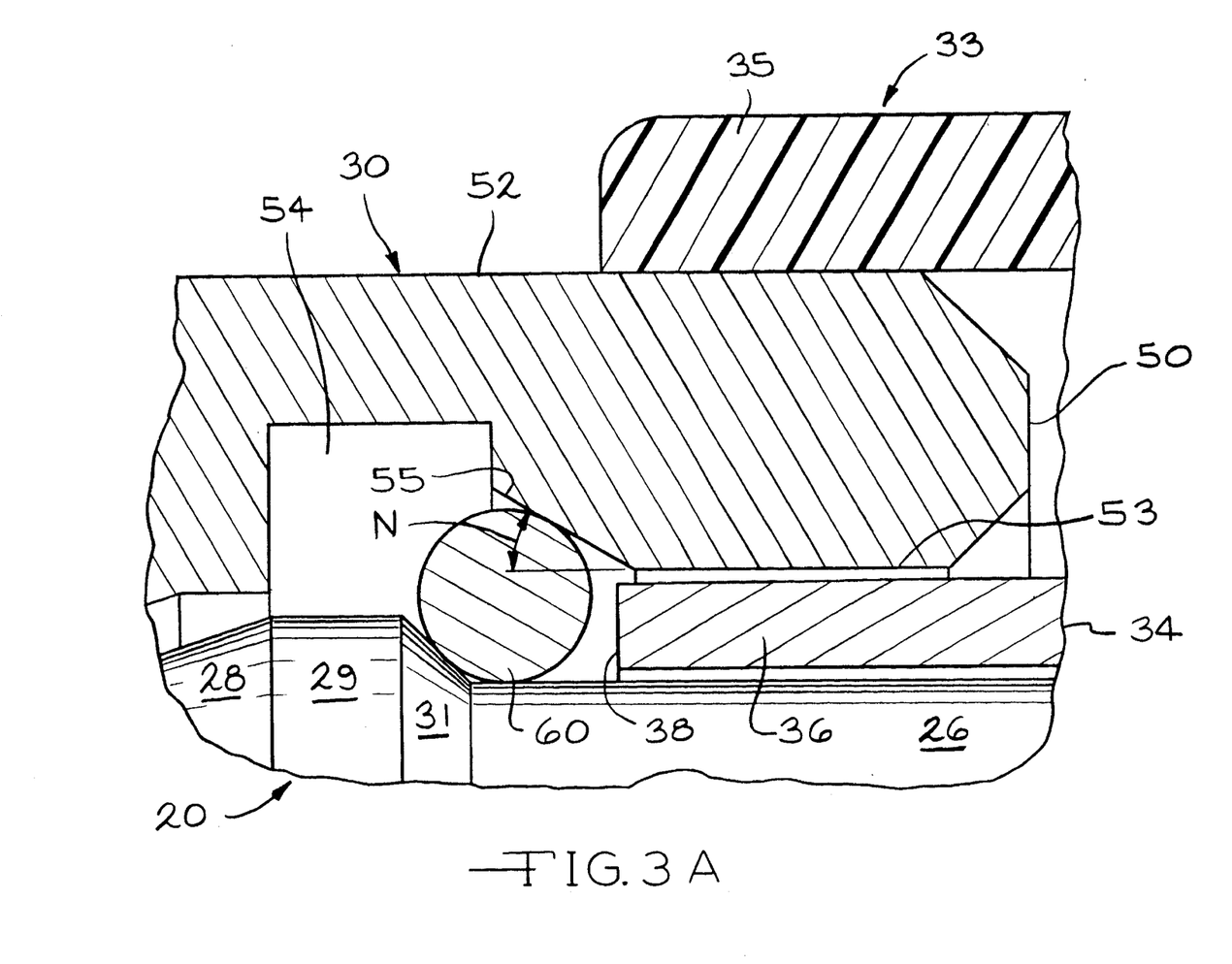
FIG. 3A is an enlarged fragmentary view of the rib, split locking ring, groove, and release sleeve of the fully coupled assembly of FIG. 3.
Figure 5:
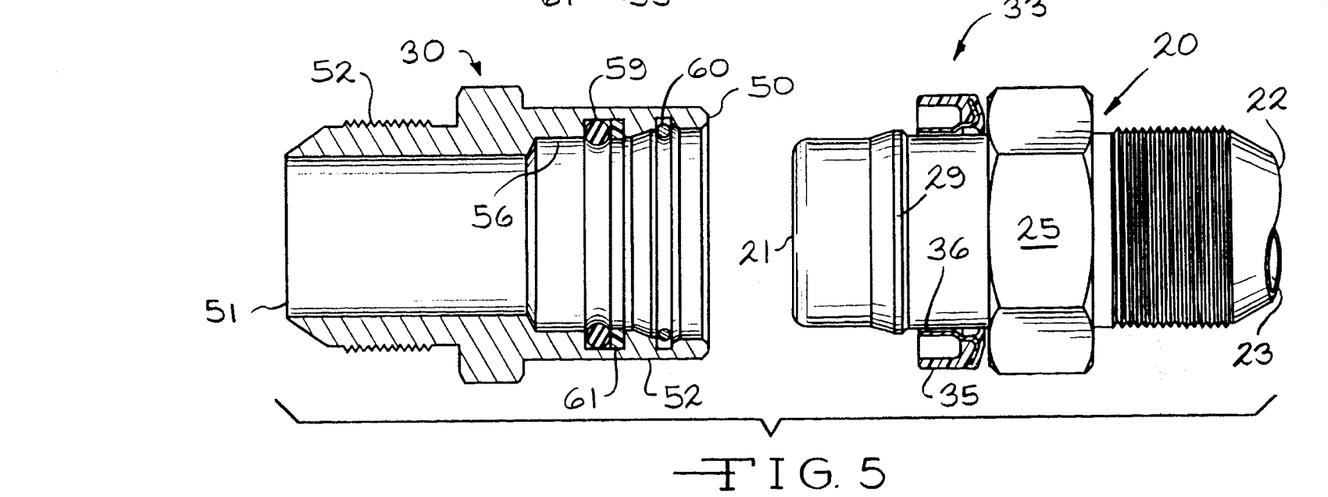
FIG. 5 is a view similar to FIGS. 3 and 4 but showing the male member and female member in a disengaged position.

Thus, as may be seen FIGS. 3, 3A and 5, upon insertion of the first male member 20 into the second female member 30, the leading end 21 and leading exterior surface 27 will pass through the split locking ring 60 until the ramp 28 reaches the split locking ring 60. Continued inward movement of the male member 20 will cause the ramp 28 to expand the locking ring 60 thereby opening up the gap between the ends 62 and 63 by increasing amounts as the locking ring 60 moves up to the maximum diameter of the ramp 28 and onto the cylindrical surface 29. As the cylindrical surface 29 moves past the split locking ring 60 upon continued forward movement of the first male member 20, the split locking ring 60, by virtue of the resilience of the metal will contract to a size approaching its original size and, in do so, will be positioned to prevent withdrawal of the first male member 20 from the second female member 30 by virtue of the split locking ring 60 being engaged to the shoulder 31.

As will be appreciated from viewing FIG. 3A the tapered shoulder 31 and the chamfer 55 are disposed at converging angles in the direction toward the annular groove 54 when the first male member 20 is engaged to the female member 30. This convergence results from the fact that the angle of the tapered shoulder 31 is greater than the angle of the chamfer 55 in relation to the axis A as previously set forth.

When the first male member 20 is fully engaged to the second female member 30, the leading exterior surface 27 is sealingly engaged to the annular seal 59 thereby preventing leaking of fluid. Additionally, receiving end 50 and portions of the second female member adjacent thereto are positioned in the gap 46 between the cylindrical wall portion 45 of the TPE portion 35 and the split cylindrical wall 36 of the metal portion. The exterior cylindrical surface 52 is snugly in contact with the interior of the cylindrical wall portion 45 thereby preventing, along with the sealing fin 47, dust or other contaminants from the entering the area around the split metal locking ring 60 when the members are in the engaged position of FIG. 3.

As can be seen from FIG. 3, when the first male member 20 is in the fully coupled or engaged position with the second female member 30, there is a space between the receiving end 50 and the interior of the flange portion 44 which is, in effect, the end of the gap 46. Additionally, the leading end 38 of the release sleeve split cylindrical wall 36 is barely touching or, preferably, slightly spaced from the split metal locking ring 60. (See FIG. 3A). When it is desired to disconnect the first male member 20 from the second female member 30, it is simply necessary to move the release sleeve 33 toward the leading end 21 thereby causing the leading end 38 of the split cylindrical wall to urge the split metal locking ring 60 axially toward the rib and, in so doing, to be urged outwardly by the tapered shoulder 31 against which the split metal locking ring 60 is being urged by the release sleeve.

As will be appreciated, when the split metal locking ring 60 has been urged to a position in alignment with the cylindrical surface 29 of the rib, the first male member 20 will be released from the second female member 30 and may be removed therefrom. Inasmuch as the release sleeve 33 has a split cylindrical wall 36 with slots 37, the segments of the split cylindrical wall 36 between the slots 37 can be deflected outwardly by the tapered shoulder 31 thereby ensuring that the release sleeve 33 can be moved far enough toward the leading end 21 to ensure that it forces the split metal locking ring 60 out of engagement with the tapered shoulder 31 and into the annular groove 54 as it engages the cylindrical surface 29 thereby permitting release of the male member 20 from the female member. This is the position shown in FIG. 4. In being moved to the extreme release position toward the leading end 21, the portion of the release sleeve split cylindrical wall 36 adjacent the leading end 38 may be deflected outwardly by the movement of the leading end 38 against the tapered shoulder 31.

Figures 8, 9:
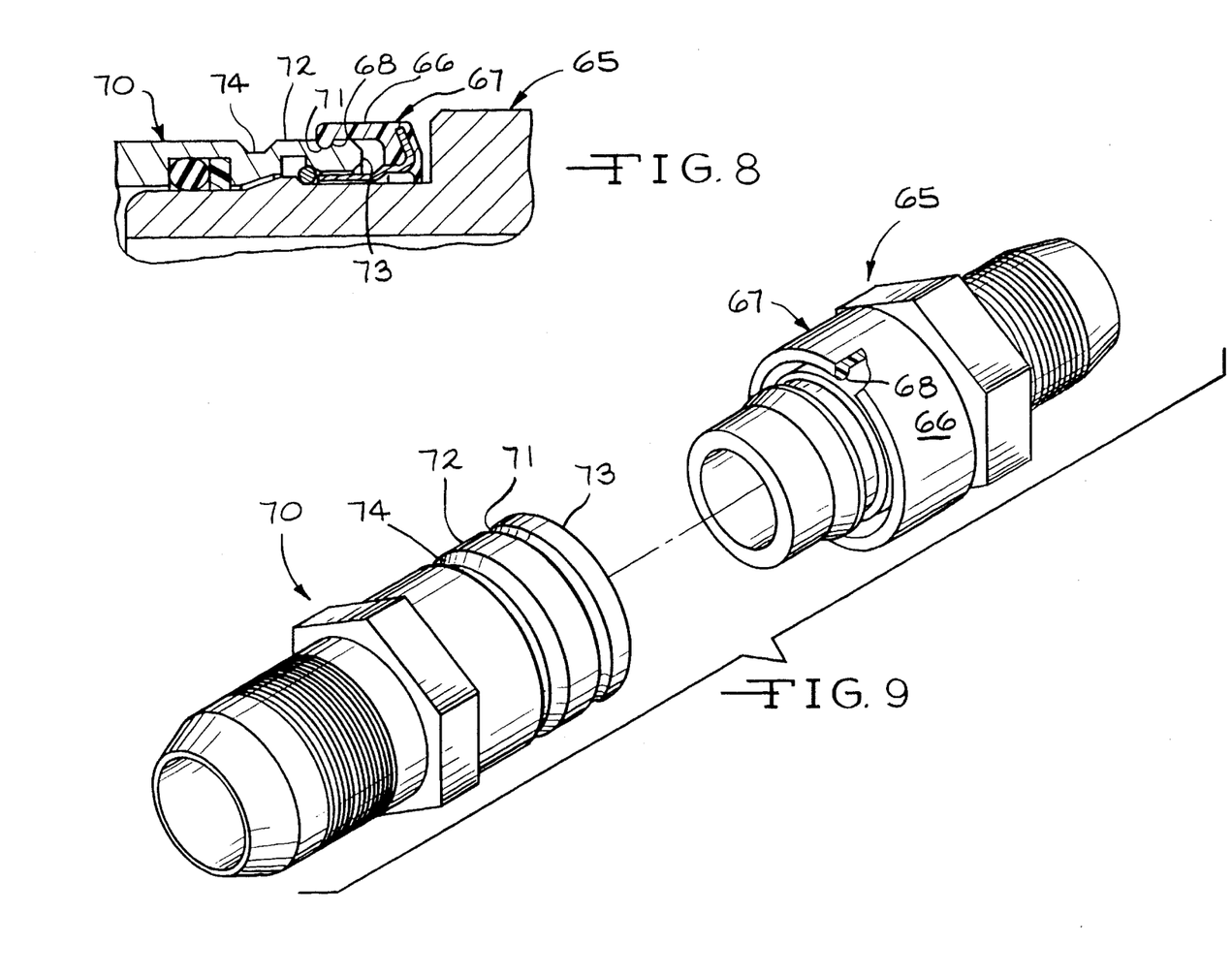
FIG. 8 is an enlarge fragmentary view of a modified embodiment showing the male and female members in the fully coupled position.
FIG. 9 is a perspective view of the respective male and female members of the embodiment shown in FIG. 8 in a disengaged position.

Referring now to FIGS. 8 and 9, there is shown a modified embodiment. Under this embodiment, there is provided a male member 65 and a female member 70. The female member 70 is exactly the same as the second female member 30 of the first embodiment with one major exception, namely, the presence of an outwardly facing annular groove 71 in the exterior surface 72 in an area slightly spaced from the receiving end 73.

The male member 65 is identical to the first male member 20 of the first embodiment except for the fact that the cylindrical wall portion 66 of the release sleeve 67 has an inwardly facing annular bead 68 positioned to be received in the annular groove 71 when the male member 65 is fully engaged to the female member 70. This provides visual assurance that the male member 65 has been fully inserted to a position of complete locking engagement with the female member 70.

Additionally, if desired, the female member 70 may be provided with a second outwardly facing annular groove 74 spaced from the annular groove 71. The second annular groove 74 provides means for gripping the female member 70 during its fabrication thereby assisting in production efficiencies.

Figure 10:
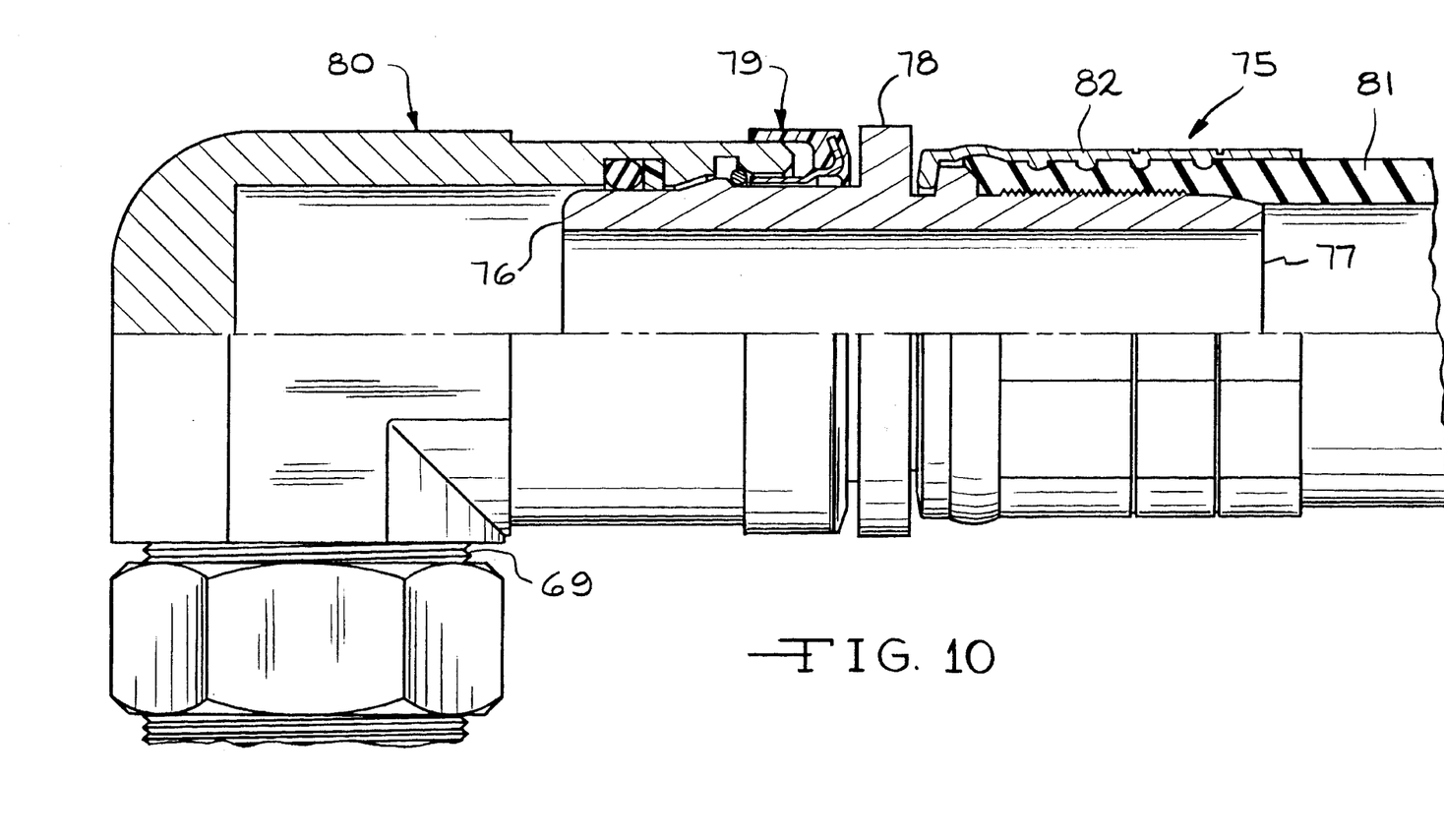
FIG. 10 is a sectional view showing a modified embodiment.

Referring now to FIG. 10, there shown another embodiment in which is provided a male member 75 and a female member 80. The male member 75 extends from a leading end 76 to a trailing end 77 with a generally centrally located annular rib 78. The portion of the male member 75 between the rib 78 and the trailing end 77 is provided with a well known prior art hose connection configuration with a hose 81 clamped thereto by a crimped collar 82.

Figure 4:
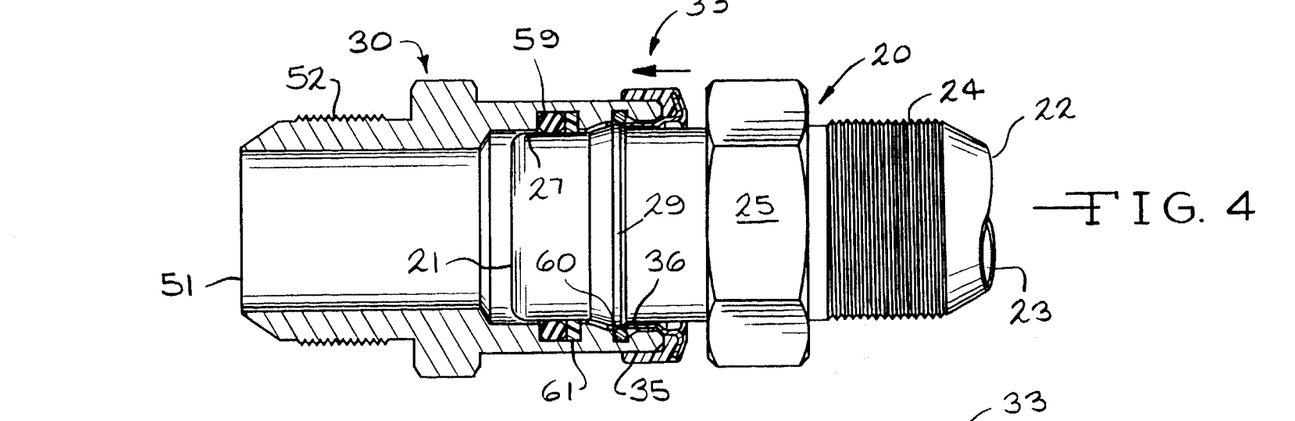
FIG. 4 is a view similar to FIG. 3 but showing the relative positioning of the parts upon movement of the release sleeve to a position causing the split locking ring to be moved to the release position.

The portion of the male member 75 between the collar 78 and the leading end 76 is identical to that described in the embodiment of FIGS. 3 through 5 including the presence of a release sleeve 79. In the embodiment of FIG. 10, the outer diameter of the collar 78 is at least as great the outer diameter of the release sleeve 79. Under this embodiment, the presence of the collar 78 having a diameter at least as large as that of the release sleeve 79 serves to prevent the release sleeve 79 from inadvertently being moved forward toward the leading end 76 and thereby minimizing the chance of inadvertently causing the male member 75 to become disengaged from the female member 80.

The female member 80 is shown with a 90° bend and threads 82 for connection to a threaded connector. All portions of the female member 80 which are engaged by the male member 75 are identical to that described in the embodiment of FIGS. 3 through 5.

Figure 11:
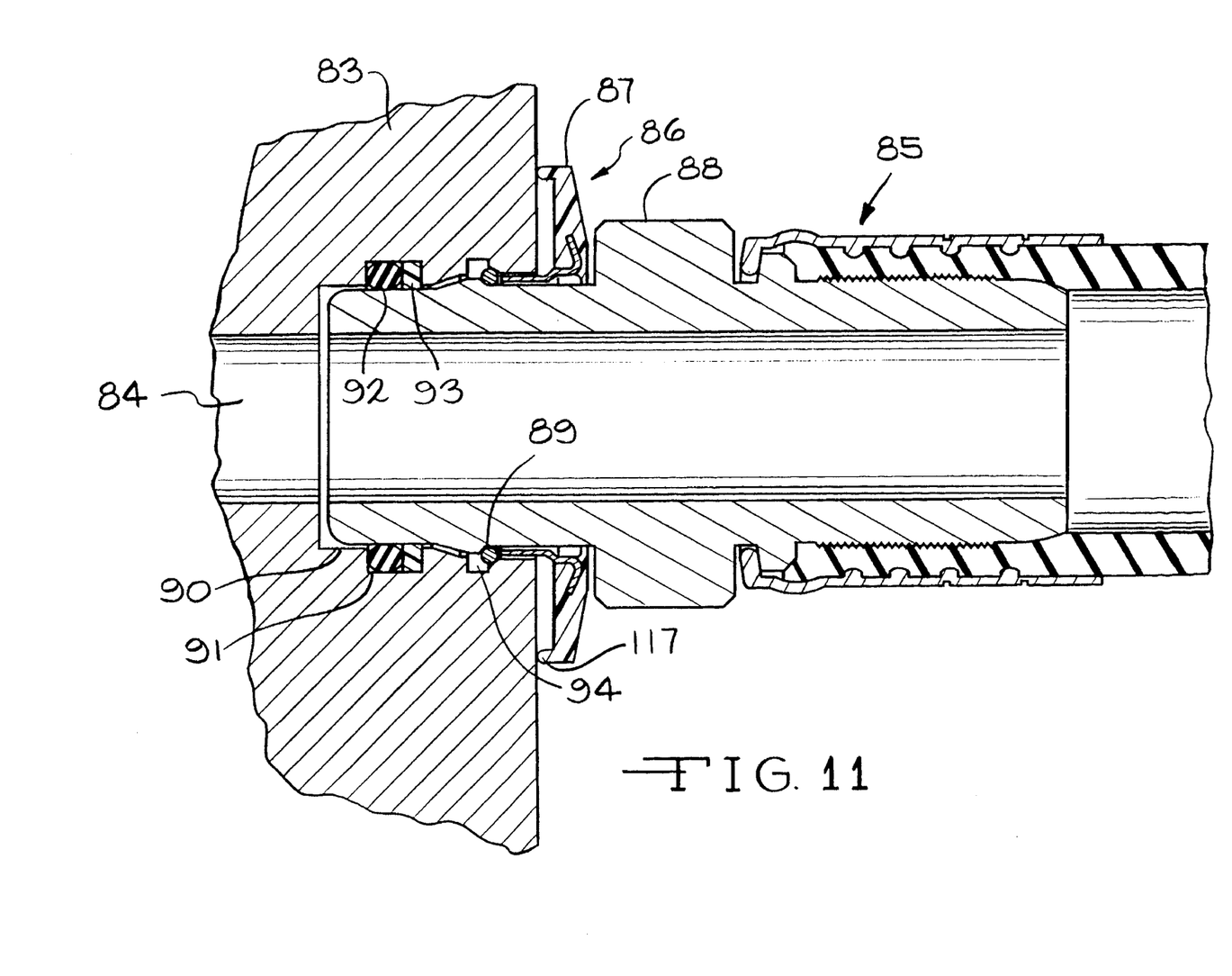
FIG. 11 is a sectional view showing a further modified embodiment.

Referring now to FIG. 11, there is shown yet another embodiment in which a wall 83 of a pressure receptacle having a passageway 84 with an enlarged cavity 90 which may be configured to directly receive a male member 85. Under this embodiment the male member 85 is identical to that shown in FIG. 10 with the exception of the release sleeve. Under this embodiment, the release sleeve 86 is provided with an enlarged radial TPE flange 87 which extends radially outwardly a significant extent beyond the radial extent of the collar 88 in order to permit ready access to move the release sleeve 86 forwardly to the release position. The flange 87 is provided with an annular bead 117 which engages the exposed face of wall 83 when the male member is in the fully engaged position to prevent dust and dirt from entering the cavity 90.

The cavity 90 has formed therein an inwardly facing annular groove 91 for receiving an annular seal 92 and a rigid plastic ring 93. A second inwardly facing annular groove 94 is provided for receiving the split locking ring 89.

As can be seen in FIG. 11, when the male member 85 is in the fully engaged position in the cavity 90, the portion of flange 87 of the release sleeve 86 inwardly from the annular bead 117 will be spaced from the exposed face of wall 83 a distance sufficient to permit the release sleeve 86 to be moved forwardly towards such wall 83 a distance sufficient to cause the release sleeve 86 to urge the split locking ring 89 over the rib and into the second inwardly facing annular groove 94 to thereby release the male member 85 from the wall 83 of the pressure receptacle. If desired, a tool may be inserted between the collar 88 and the release sleeve to assist in urging the release sleeve 86 forwardly.

Figure 12:
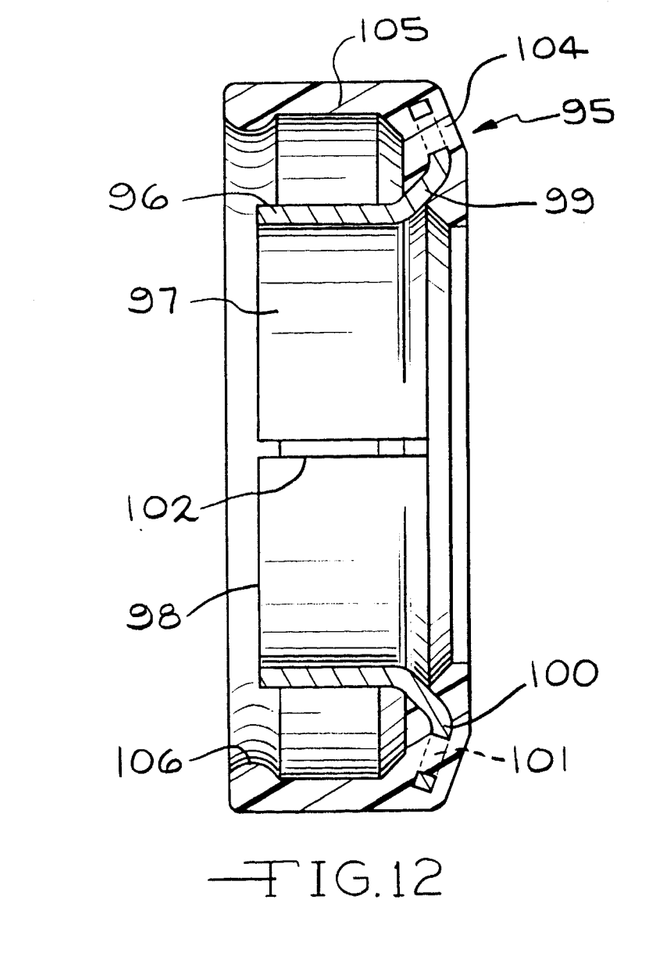
FIG. 12 is a sectional view of a modified release sleeve.
Figure 13:
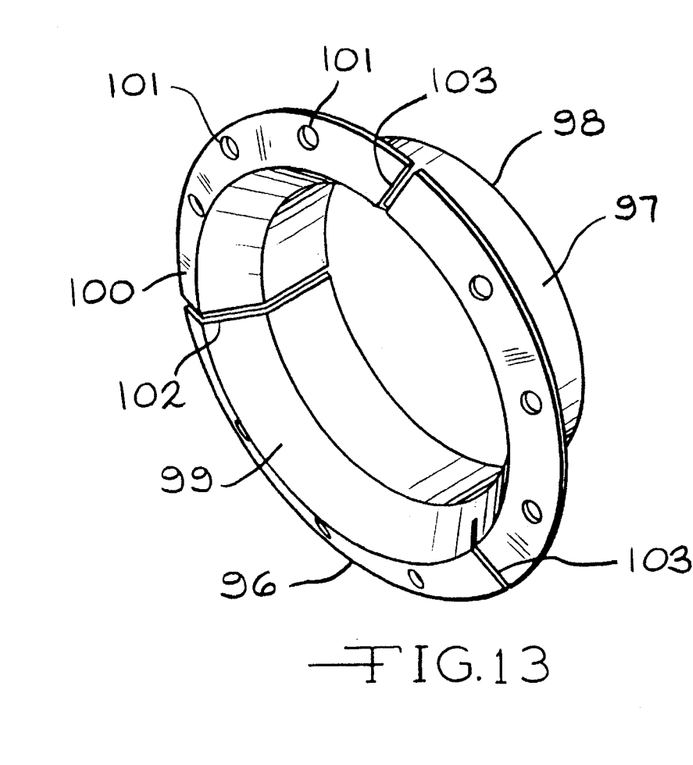
FIG. 13 is a perspective view of the metal portion of the modified release sleeve of FIG. 12.

Referring now to FIGS. 12 and 13, there is shown a modified release sleeve 95. The modified release sleeve 95 is easier to manufacture and therefore less expensive than the release sleeve 33 shown in the previous embodiments. The release sleeve 95 includes a metal portion 96 having a cylindrical wall portion 97 extending from a leading end 98 intended to engage and push against a split metal locking ring to thereby cause it to be released to an outwardly tapering portion 99 which in turns extends to an outwardly extending flange 100. The flange 100 has a plurality of apertures 101. A single slot or split 102 extends completely through the metal portion 96 from the leading end 98 through the cylindrical portion 97, outwardly tapering portion 99 and flange 100. Additionally, there are provided two auxiliary slots 103 which extend through the flange 100 and partially into the outwardly tapering portion 99.

The second component of the modified release sleeve is a plastic member integrately molded therewith which includes a flange portion 104 extending through the apertures 101 and annular wall 105 spaced from and generally parallel to the cylindrical portion 97. If desired, the cylindrical wall may have an inwardly facing annular bead 106 at its forward end.

The presence of the slot 102 permits the cylindrical wall portion 97 to expand as the release sleeve is moved to a forward release position up the tapered shoulder 31 and onto the cylindrical surface 29. The presence of the auxiliary slots 103 prevents a build up of stresses in the flange 100 and outwardly tapering portion 99 as the cylindrical wall portion 97 expands.

Figure 14:
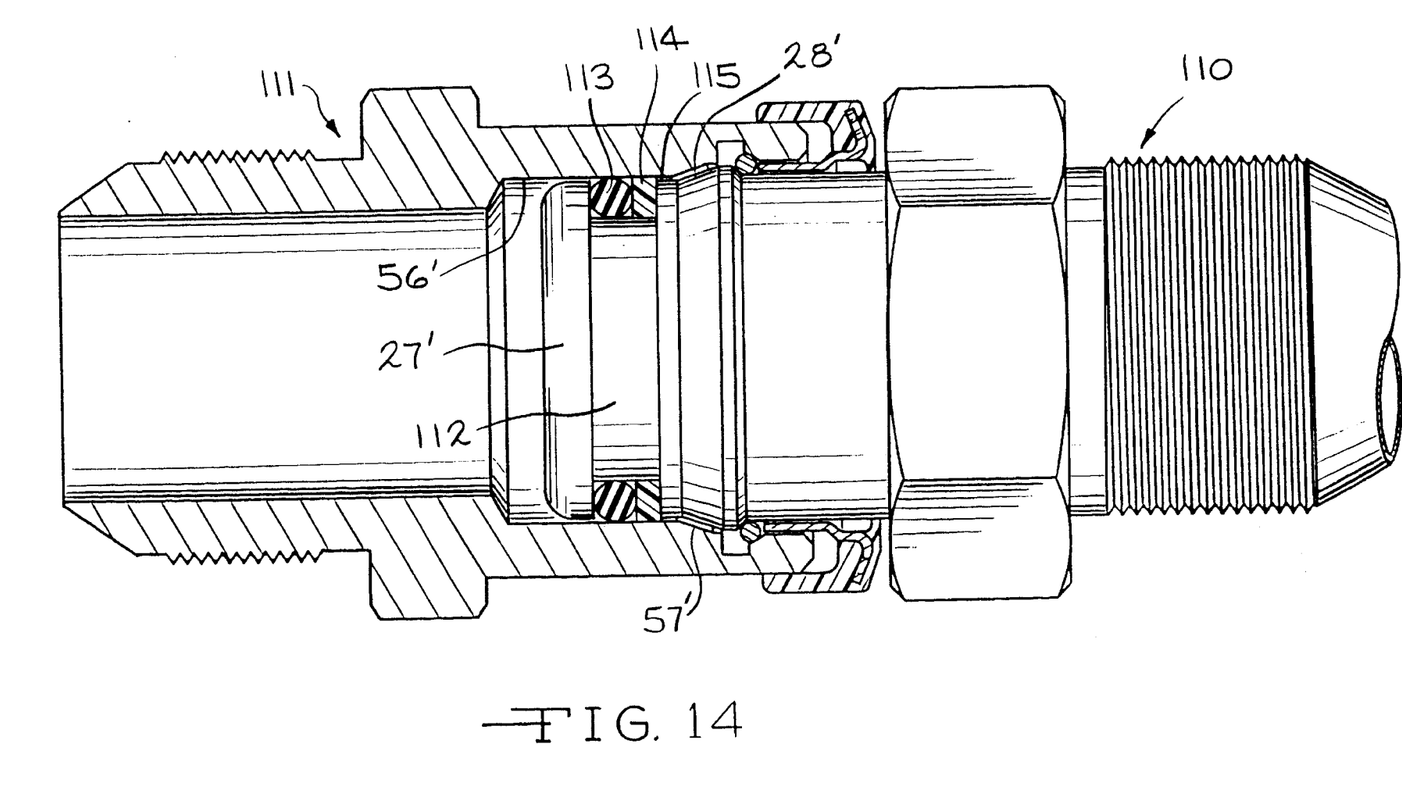
FIG. 14 is a sectional view showing yet another embodiment.

Referring now to FIG. 14, there is shown yet another embodiment in which there is provided a male member 110 and a female member 111. The male member 110 of this embodiment is identical to the male member 20 of the embodiment shown in FIG. 3 with the exception that leading exterior surface 27' has an annular groove 112 in which is positioned an annular seal 113 and a rigid plastic ring 114 positioned between the ramp 28' and the annular seal 113. The purpose of the rigid plastic ring is to protect the annular seal from damage particularly in instances where the coupling is used in high impulse applications. In such high impulse applications, the rigid plastic ring 114 serves to prevent the seal from becoming damage by protecting it from contact with the trailing corner 115 of the groove 112.

The female member 111 is identical to the female member 30 of the embodiment shown in FIG. 3 except for the fact that the second interior cylindrical surface 56' is continuous until reaching the outwardly flaring tapered wall portion 57'.

Many modifications will become readily apparent to those skilled in the art. Accordingly, the scope of the present invention should be limited only by the scope of the claims appended hereto.

We claim:

1. A coupling assembly for connecting two members comprising in combination:
   (a) a split locking ring having a first end and a second end, said first and second ends being aligned to permit abutting engagement, said ring being expandable to define a gap between said first and second ends;
   (b) a first member extending along an axis from a forward end toward a rearward position and having an exterior surface, a rib extending outwardly from said exterior surface, said rib including
      (i) a ramp tapering outwardly in a direction away from said forward end and away from said axis at an angle in the range of 10° to 25° relative to said axis,
      (ii) a cylindrical surface parallel to said axis extending rearwardly from said ramp a distance of at least 0.010 inch; and
      (iii) a shoulder tapering away from said forward end and inwardly toward said axis, said cylindrical surface connecting said ramp and said shoulder; and
   (c) a second member extending from a receiving end to a remote end including
      (i) an inwardly facing cylindrical wall sized to received said first member including said rib and extending axially from a position closely adjacent said receiving end toward said remote end, and
      (ii) an inwardly facing annular groove extending outwardly from said inwardly facing cylindrical wall, said split locking ring being receivable in said annular groove, said annular groove having surfaces extending outwardly from said inwardly facing cylindrical wall including a first surface defining one portion of said groove and a second surface positioned between said first surface and said receiving end, said second surface including a chamfer tapering inwardly toward said axis in a direction toward said receiving end and being disposed at an angle relative to said axis which is smaller than the angle between said shoulder and said axis;

said first member and said second member being sized such that upon insertion of said first member into said second member, said split locking ring travels up said ramp to increase the size of said gap, over said rib cylindrical surface and contracts to reduce the size of said gap and to engage said shoulder becoming trapped between said shoulder and said chamfer.

2. The coupling assembly according to claim 1 wherein said second member has an annular recess extending outwardly from said inwardly facing cylindrical wall and a resilient annular seal received in said annular recess, a portion of said annular seal extending inwardly of said inwardly facing cylindrical wall and wherein said first member has a sealing portion between said forward end and said ramp said sealing portion sized to sealingly engage said annular seal upon engagement of said first member in said second member.

3. The coupling assembly according to claim 2 further including a rigid annular ring positioned in said annular recess such that it is located axially between said annular seal and said annular groove, a portion of said rigid annular ring being inwardly of said inwardly facing cylindrical wall.

4. The coupling assembly according to claim 1 wherein said ramp tapers at an angle in the range of 16° to 20° relative to said axis.

5. The coupling assembly according to claim 1 wherein said cylindrical surface extends rearwardly from said ramp a distance of at least 0.030 inch.

6. The coupling assembly according to claim 1 wherein said shoulder tapers at an angle in the range of 35° to 55° relative to said axis and said chamfer tapers at an angle in the range of 20° to 40° relative to said axis.

7. The coupling assembly according to claim 1 wherein said split locking ring is formed of spring tempered stainless steel.

8. The coupling assembly according to claim 1 further including a release sleeve movably mounted on said exterior surface of said first member for movement from a rearward position to a forward position, said sleeve having an edge facing toward said shoulder and having a leading portion extending from said edge, said leading portion having at least one slot, movement of said release sleeve from a rearward position to a forward position forcing said split ring up said shoulder into said annular grove and over said cylindrical surface to release said first member from said second member.

9. The coupling assembly according to claim 1 wherein said first member has an annular recess extending inwardly from said exterior surface and a resilient annular seal received in said annular recess, a portion of said annular seal being outwardly of said exterior surface to sealingly engage said second member inwardly facing cylindrical wall upon engagement of said first member in said second member.

10. The coupling assembly according to claim 9 further including a rigid annular ring positioned in said annular recess such that it is located axially between said forward end and said rib, a portion of said rigid annular ring being outwardly of said exterior surface.

11. A coupling assembly for connecting two members comprising in combination:

(a) a split locking ring having a first end and a second end, said first and second ends being aligned to permit abutting engagement and defining a gap;

(b) a first member extending along an axis from a forward end toward a rearward portion and having an exterior surface, a rib extending outwardly from said exterior surface, said rib including (i) a ramp tapering outwardly in a direction away from said forward end and away from said axis at an angle in the range of 10° to 25° relative to said axis, (ii) a cylindrical surface parallel to said axis extending rearwardly from said ramp a distance of at least 0.010 inch; and (iii) a shoulder tapering away from said forward end and inwardly toward said axis, said cylindrical surface connecting said ramp and said shoulder;

(c) a second member having a receiving end and a leading portion extending therefrom, said leading portion having (i) an inwardly facing cylindrical wall sized to receive said first member including said rib and (ii) an inwardly facing annular groove, said annular groove including first and second spaced apart surfaces extending outwardly from said inwardly facing cylindrical wall, said second surface being positioned between said receiving end and said first surface and including a chamfer tapering toward said axis and said receiving end at an angle relative to said axis smaller than the angle between said shoulder and said axis, said split locking ring being receivable in said annular groove; and (d) a release sleeve movably mounted on said exterior surface of said first member for movement from a rearward position to a forward position, said sleeve having an edge facing toward said shoulder and having a leading portion extending from said edge, said leading portion having at least one slot;

said first member end said second member being sized such that upon insertion of said first member into said second member, said split locking ring travels up said ramp to increase the size of said gap, over said rib cylindrical surface and contracts to reduce the size of said gap and to engage said shoulder and said chamfer and said first and second members are released from each other upon movement of said release sleeve from a rearward position to a forward position forcing said split ring up said shoulder into said annular groove and over said rib cylindrical surface.

12. The coupling assembly according to claim 11 wherein said second member has an annular recess extending outwardly from said inwardly facing cylindrical wall and a resilient annular seal received in said annular recess, a portion of said annular seal being inwardly of said inwardly facing cylindrical wall and wherein said first member has a sealing portion between said forward end and said ramp, said sealing portion sized to sealingly engage said annular seal upon engagement of said first member in said second member.

13. The coupling assembly according to claim 12 further including a rigid annular ring positioned in said annular recess such that it is located axially between said annular seal and said annular groove, a portion of said rigid annular ring being inwardly of said inwardly facing cylindrical wall.

14. The coupling assembly according to claim 11 wherein said first member has an annular recess extending inwardly from said exterior surface and a resilient annular seal received in said annular recess, a portion of said annular seal being outwardly of said exterior surface to sealingly engage said second member inner surface upon engagement of said first member in said second member.

15. The coupling assembly according to claim 14 further including a rigid annular ring positioned in said annular recess such that it is located axially between said forward end and said rib, a portion of said rigid annular ring being outwardly of said exterior surface.

16. The coupling assembly according to claim 11 wherein said release sleeve includes a non-slotted portion extending axially from said leading portion, and a flange extending outwardly from said non-slotted portion.

17. The coupling assembly according to claim 11 wherein said release sleeve includes an outwardly extending flange and an annular wall extending therefrom spaced radially outwardly of said leading portion, said annular wall including an interior surface sized to receive said second member in contacting engagement.

18. The coupling assembly according to claim 17 wherein said release sleeve further includes a sealing fin extending inwardly from said flange in sealing engagement with said first member.

19. The coupling assembly according to claim 17 wherein said annular wall is resilient and has a bead extending inwardly from said interior surface and said second member leading portion has an exterior surface and an annular groove formed in said exterior surface, said annular groove being position to receive said bead upon engagement of said first member to said second member.

20. The coupling assembly according to claim 17 wherein said first member has a radially extending collar in the vicinity of said release sleeve outwardly extending flange, said collar having a radial extent at least as great as the radial extent of said flange.

21. The coupling assembly according to claim 11 wherein said ramp tapers at an angle in the range of 16° to 20° relative to said axis.

22. The coupling assembly according to claim 11 wherein said cylindrical surface extends rearwardly from said ramp a distance of at least 0.030 inch.

23. The coupling assembly according to claim 11 wherein said shoulder tapers at an angle in the range of 35° to 55° relative to said axis and said chamfer tapers at an angle in the range of 20° to 40° relative to said axis.

24. The coupling assembly according to claim 11 wherein said split locking ring is formed of spring tempered stainless steel.

25. The coupling assembly according to claim 11 wherein said second member leading end includes an exposed face extending radially outwardly beyond said leading portion inner surface and said release sleeve includes a flange extending radially outwardly beyond said leading portion inner surface, said flange including a radially inner portion spaced axially from said exposed face when said first member is engaged to said second member.

26. The coupling assembly according to claim 25 wherein said flange includes a radially outer portion defining an annulus in contact with said exposed face.

27. A coupling assembly comprising
(a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a ramp extending axially away from said leading end and outwardly from said first exterior cylindrical surface, (ii) a cylindrical exterior surface portion parallel to said axis having a minimum axial distance of 0.010 inch and (iii) a shoulder tapering inwardly and axially away from said first exterior cylindrical surface portion and a release sleeve encircling said second cylindrical exterior surface, said release sleeve including a split cylindrical wall portion having a leading end facing said shoulder and an outwardly extending flange spaced from said leading end; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said first groove surface and said receiving end, said second groove surface including a chamfer tapering inwardly toward said axis in a direction toward said receiving end at an angle relative to said axis less than the angle between said shoulder and said axis, and a second inwardly facing surface sized to receive said male member leading end and first exterior cylindrical surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

28. The coupling assembly according to claim 27 wherein said female member has an annular recess extending outwardly from said second inwardly facing cylindrical surface and a resilient annular seal received in said annular recess, a portion of said annular sealing being inwardly of said inwardly facing cylindrical surface and wherein said male member first cylindrical exterior surface is sized to sealingly engage said annular seal upon engagement of said male member to said female member.

29. The coupling assembly according to claim 28 further including a rigid annular ring positioned in said annular recess such that it is located axially between said annular seal and said annular groove, a portion of said rigid annular ring being inwardly of said inner surface.

30. The coupling assembly according to claim 27 wherein said ramp tapers at an angle in the range of 16° to 20° relative to said axis.

31. The coupling assembly according to claim 27 wherein said cylindrical surface extends rearwardly from said ramp a distance of at least 0.030 inch.

32. The coupling assembly according to claim 27 wherein said shoulder tapers at an angle in the range of 35° to 55° relative to said axis and said chamfer tapers at an angle in the range of 20° to 40° relative to said axis.

33. The coupling assembly according to claim 27 wherein said split locking ring is formed of spring tempered stainless steel.

34. The coupling assembly according to claim 27 wherein said male member has an annular recess extending inwardly from said first cylindrical exterior surface and a resilient annular seal received in said annular recess, a portion of said annular seal being outwardly of said first cylindrical exterior surface to sealingly engage said female member second inwardly face surface upon engagement of said first member to said second member.

35. The coupling assembly according to claim 34 further including a rigid annular ring positioned in said annular recess such that it is located axially between said annular seal and said rib, a portion of said rigid annular ring being outwardly of said first cylindrical exterior surface.

36. The coupling assembly according to claim 27 wherein said release sleeve includes a non-slotted portion extending axially from said leading portion, and a flange extending outwardly from said non-slotted portion.

37. The coupling assembly according to claim 27 wherein said release sleeve includes an outwardly extending flange and an annular wall extending therefrom spaced radially outwardly of said split cylindrical wall portion, said annular wall including an interior surface sized to receive said female member in contacting engagement.

38. The coupling assembly according to claim 37 wherein said release sleeve further includes a sealing fin extending inwardly from said flange in sealing engagement with said male member.

39. The coupling assembly according to claim 37 wherein said annular wall is resilient and has a bead extending inwardly from said interior surface and said female member has an exterior surface and an annular groove formed in said exterior surface, said annular groove being positioned to receive said bead upon engagement of said male member to said female member.

40. The coupling assembly according to claim 37 wherein said male member has a radially extending collar in the vicinity of said release sleeve outwardly extending flange, said collar having a radial extent at least as great as the radial extent of said flange.

41. The coupling assembly according to claim 27 wherein said female member receiving end includes an exposed face extending radially outwardly beyond said cavity and said release sleeve includes a flange extending radially outwardly beyond said cavity, said flange including a radially inner portion spaced axially from said exposed face when said male member is engaged to said female member.

42. The coupling assembly according to claim 41 wherein said flange includes a radially outer portion defining an annulus in contact with said exposed face.

43. A coupling assembly comprising (a) a male member extending from a leading end to a trailing end, a first cylindrical exterior surface extending from said leading end, a second cylindrical exterior surface spaced from said first cylindrical exterior surface and a rib between said first cylindrical exterior surface and said second cylindrical exterior surface, said rib including (i) a ramp extending axially away from said leading end and outwardly from said first exterior cylindrical surface, (ii) a cylindrical exterior surface portion parallel to said axis having a minimum axial distance of 0.010 inch and (iii) a shoulder tapering inwardly and axially away from said first cylindrical exterior surface portion; and (b) a female member including a receiving end with a cavity sized to receive said male member, said cavity including a first inwardly facing cylindrical surface adjacent said receiving end sized to receive said rib, an inwardly facing annular groove including spaced apart first and second surfaces extending outwardly from said first inwardly facing cylindrical surface, said second groove surface being positioned between said receiving end and said first groove surface and including a chamfer tapering toward said axis and said receiving end of an angle relative to said axis which is less than the angle between said shoulder and said axis, and a second inwardly facing surface sized to receive said male member leading end and first cylindrical exterior surface; and (c) a split locking ring positioned in said female member inwardly facing annular groove and sized for movement in said annular groove, said split locking ring having a first end and a second end aligned for abutting relationship and having a gap, said split locking ring having an interior diameter sized to receive said male member first cylindrical exterior surface portion and to be engaged and expanded to a larger radial size by said ramp upon movement of said male member further into said cavity, said split locking ring retracting in diametrical size resiliently to become trapped between said shoulder and said chamfer upon the movement of said male member to a position in which said tapered shoulder is axially aligned with said split locking ring.

44. The coupling assembly according to claims 1, 11, 27 or 43 wherein said split locking ring first and second ends define a gap not to exceed 0.030 inch when said locking ring is unexpanded.

45. The coupling assembly according to claims 27 or 43 wherein said ramp is at an angle of 10° to 25° relative to said axis.

* * * * *